Aug. 29, 1950 T. B. MARTIN ET AL 2,520,687
SPINNER MOUNTING
Filed Oct. 2, 1945 2 Sheets-Sheet 1

INVENTORS
THOMAS B. MARTIN
BY HARRY R. WILLIAMS
Spencer, Hardman & Fehr
their ATTORNEYS

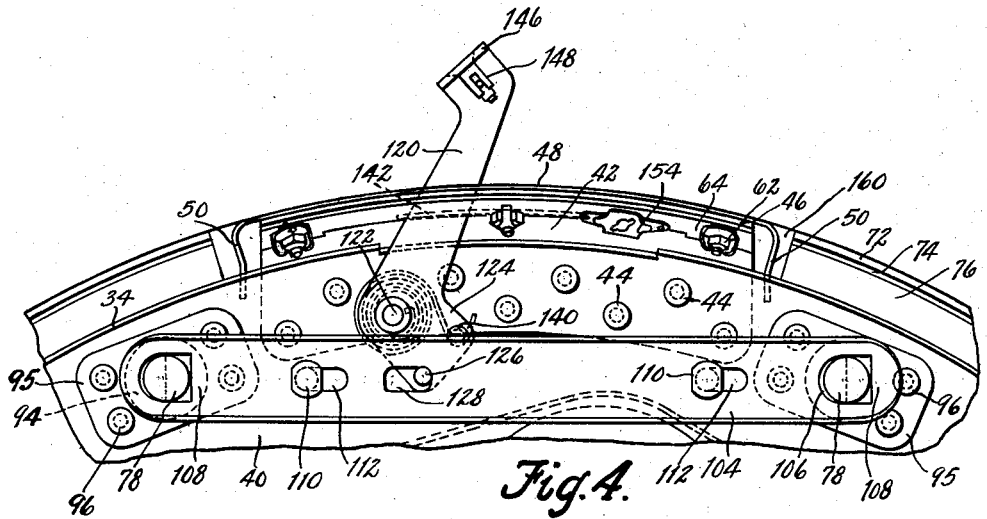
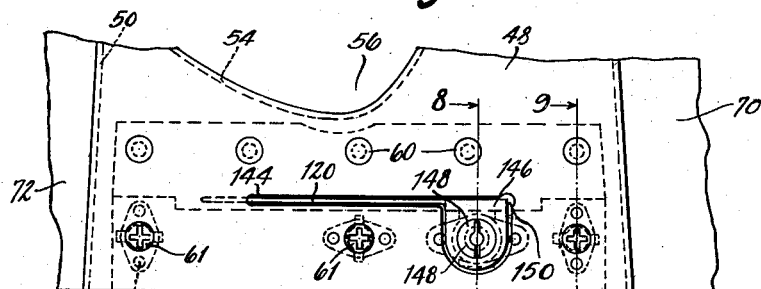
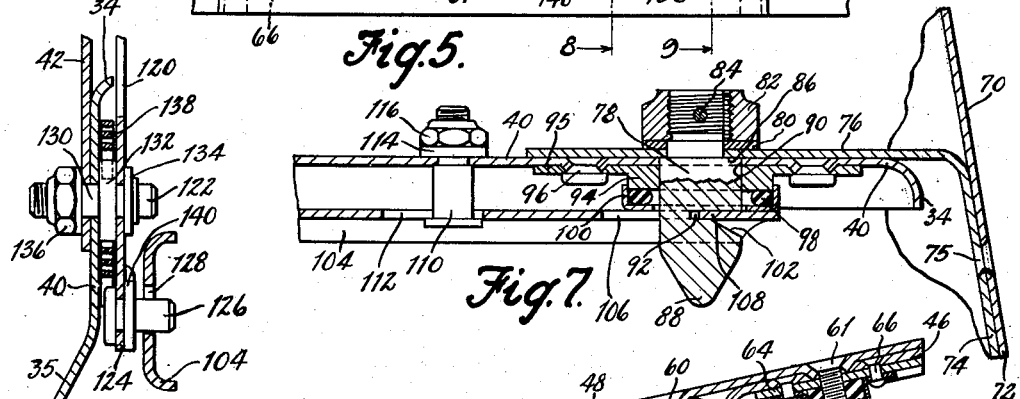
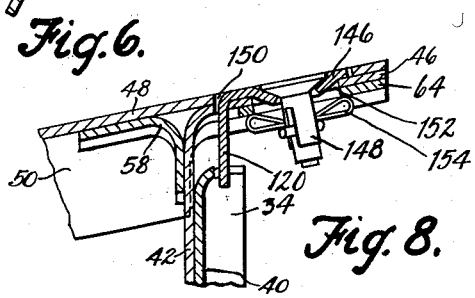
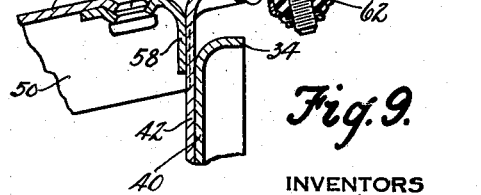
INVENTORS
THOMAS B. MARTIN
BY HARRY R. WILLIAMS
Spencer, Hardman & Fehr
their ATTORNEYS Patented Aug. 29, 1950

2,520,687

UNITED STATES PATENT OFFICE 2,520,687

SPINNER MOUNTING

Thomas B. Martin and Harry R. Williams, Dayton, Ohio, assignors to General Motors Corporation, Detroit, Mich., a corporation of Delaware Application October 2, 1945, Serial No. 619,768

14 Claims. (Cl. 170—159)

This invention relates to aircraft propellers, and has for a principal object to releasably mount a spinner or fairing piece for the hub with secure locking provisions, which will give a visual indication of the security of the lock.

A further object of the invention is to provide securing means for a fairing piece about a propeller, which fairing piece may be quickly attached in secured relation, and quickly removed for inspection and service of the enclosed propeller hub or other mechanism.

A further object of the invention is to provide a releasable securing means for a spinner fairing which must be forceably actuated for accomplishing the locked relation, and which will give a clearly perceptible indication when the locking provisions are not secure.

Yet another object of the invention is to provide a spinner securing means that requires deliberate action for unlocking before the spinner may be removed from the mechanism enclosed thereby.

A still further object is to provide a visual indicating means that will inform at a distant inspection the exact condition of the spinner securing means.

An additional object of the invention is to mount a spinner shell upon a support with a yielding resilient connection so that vibration will be dampened and so that rattle will be eliminated, yet the mounting be so secured that it is impossible for looseness or release to take place until deliberate actuation is accomplished.

Further objects and advantages of the present invention will be apparent from the following description, reference being had to the accompanying drawings wherein a preferred embodiment of the present invention is clearly shown.

In the drawings:

Fig. 4 is a similar view with the lock means completely withdrawn preparatory to removal of the spinner, with the parts also giving a clear visual indication of the fact.

Fig. 5 is a fragmenetary view in top plan, showing the locking means properly secured, it being a view substantially as indicated by the arrow 5 in Figs. 1 and 2.

Fig. 6 is a sectional view through the lock actuating means substantially as indicated by the line and arrows 6—6 of Fig. 2.

Fig. 7 is a sectional view through the spinner lock and retention means substantially as indicated by the line and arrows 7—7 of Fig. 2.

Fig. 8 is a sectional view through the securing means for the actuator substantially as indicated by the line and arrows 8—8 of Fig. 2 and Fig. 5.

Fig. 9 is a sectional detail of means for attaching a filler plate substantially as indicated by the line and arrows 9—9 of Fig. 5.

Figure 1:
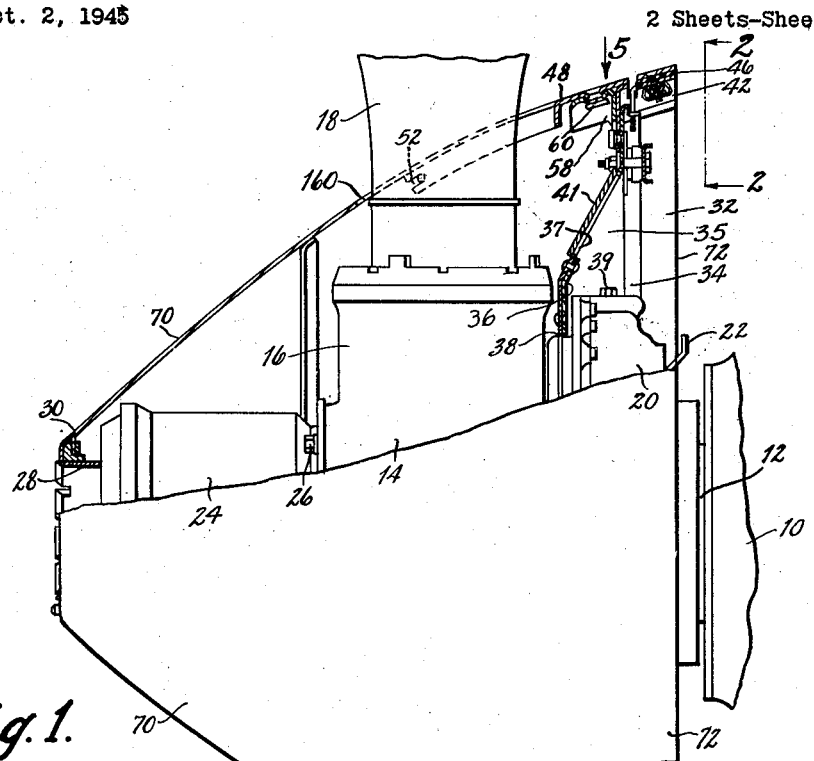
Fig. 1 is an elevational view with parts broken away to show details of the invention in section, the securing means being in the locked condition.
Figure 2:
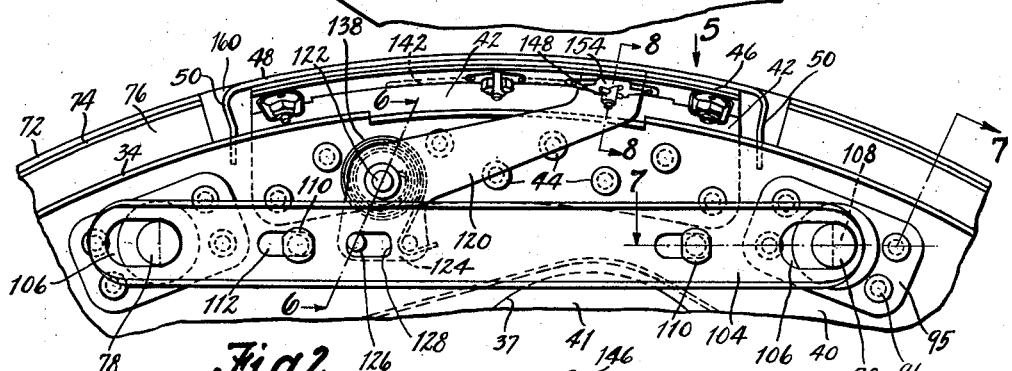
Fig. 2 is a rear end elevational view of one of the securing means shown in Fig. 1, being a view substantially as indicated by the line and arrows 2—2 thereof.

With particular reference to the drawings, 10 refers to an engine nosing or gear casing from which extends a propeller shaft 12 that supports a propeller hub 14 in driving relation, the hub having sockets 16 that carry blades 18 for pitch shifting movement. Mounted on the hub 14 may be a regulator 20 with control lever 22 for articulated control from the cockpit of the craft, and an accumulator 24 may be affixed at the forward end of the hub by means of screw devices such as shown at 26. Extending beyond the front end of the hub 14 or such other appended structure as may be incorporated, there is a spinner adapter tube 28 that slidably supports the apex end 30 of a spinner 70. At the rear end of the hub 14, such as at the periphery of the regulator 20, a bulkhead or diaphragm 32 of annular form is secured at its inner periphery and terminates at its outer periphery with a rim or rim sections 34. The bulkhead may be dished or otherwise fashioned to afford proper juncture with the hub and yet operate to enclose or cover the regulator 20, and in all events may be provided with reinforcements 36 as shown.

In the embodiment shown the bulkhead after attaching to the hub 14 or regulator 20 at 38 then cones rearwardly at 35 to end in an annular flat ring 40 before terminating in the flange 34. An opening 37 affords access to the filler plug 39 of the regulator, which opening is closed by a pivoted plate 41 anchored on the coned part 35. At circumferential points about the periphery of the bulkhead and in alignment with each of the blades 18 a flanged plate 42 is attached to the bulkhead by rivets or the like 44 so as to extend radially outside of the flange 34. Rearward extensions 46 of the plates provide face plates or seats for attaching the rear ends of filler plates 48 attached thereto for completing the enclosure about the blades. The opposite edges of these plates 48 are bent at an angle to provide flanges 50, the free end of one of which is notched at 52 to anchor beneath the head of a pin provided on the inside of the spinner in the region of the propeller disc. The flanges also rigidify the filler plate so that it can be made out of light gauge metal and not be distorted under the action of centrifugal force when the propeller is rotating. The filler plate is also flanged at 54 around the blade notch 56 for the same purpose, and an angle bracket 58 is secured to the inner surface by means of flush rivets 60 which provides a shoulder or spacer by which the plate is held in proper place when mounted on the extension 46. The filler plate is held in place by means of screws 61 threading therethrough and through the extensions 46 to anchor in elastic safety nuts 62 somewhat as shown in Fig. 9. It is convenient and desirable to provide several of the safety nuts 62 on a single strip 64 which is mounted in place on the inner side of the extension 46 by rivets or the like 66.

The form of the spinner shell member shown is conical and comprises a shell 70 flaring from the apex end 30, that slidably engages the end of tube 28, to a large diameter base portion 72 circumscribing the bulkhead or supporting member 32 and having a diameter equal to the radial limits of the extensions 46. Reinforcing elements 74 are secured to the base end of the spinner such as at 75 and have radially inward flanges 76 adapted to abut against the flat portion 40 of the bulkhead somewhat as shown in Fig. 7. The flanges 76 carry several studs 78 fitted in non-rounded holes where they are held in oriented elevation by means of washers, nuts and pins 80, 82 and 84 respectively, an enlargement or shoulder 86 preventing the stud pulling through the flange. The studs act in a dual capacity in guiding the spinner to proper position when assembling, and in assisting to lock the spinner in place. The conic or pointed tip 88 of the stud readily aligns with holes 90 in the bulkhead portion 40, and the cross slot 92 is receptive of a web or bolt for preventing withdrawal of the studs or separation of the spinner from the support.

The stud receiving holes 90 of the bulkhead are reinforced by plate-like rings 94 having ears 95 attached to the bulkhead by rivets as at 96, and compressible, soft, rubber-like rings 98 engaging the rings 94 are retained within flanged rings or cup-washers 100 to provide a cushioning effect and prevent vibration or rattle. When the spinner is assembled in proper position with respect to the bulkhead, then the studs 78 will project through the holes in the members 40, 94, 98, and 100 so that the cross slot 92 is almost clear of the ring 100. The ring 98 is preferably circular in section in its free state so that it will be readily compressible axially to something like an elliptical section as illustrated in Fig. 7 when the lock is moved to secured position. Seating of the lock or latch device is assisted by chamfering one side of the cross slot 92 as indicated at 102.

The locking means, the lock actuating means and the lock securing means are all mounted upon the bulkhead 32 and principally upon the flat portion 40, there being a plurality of all of the devices equally spaced circumferentially of the spinner and bulkhead. In the illustrated embodiment, a set of the locking provisions is disposed behind each of the blades of the propeller unit. Since each set of provisions is identical, a description of one set will suffice. The locking means comprises a reciprocating bar 104 disposed over the aligned holes in the bulkhead and rings receptive of the stud 78, and has an opening 106 also receptive of the stud 78, which opening provides a web 108 designed to enter the cross slot 92 of the stud 78. The bar is kept disposed in aligned position over the stud receiving holes by headed pins 110 received by lineally extending slots 112 in the bar, the pins being reduced in diameter where they pass through the bulkhead portion 40 to which they are secured by lock washers 114 and nuts 116. The bar 104 will thus be capable of endwise movement as limited by the pins 110 and slots 112 to allow projection of the web 108 into the cross slot 92 and withdrawal therefrom. The pins 110 also space the bar 104 with respect to the bulkhead so that the assembly of rings 94, 98 and 100 will not be displaced.

The actuating means for the lock bar 104 comprises a lever 120 pivoted at 122 to the bulkhead and having an arm 124 provided with a pin 126 engageable within a slot 128 of the bar 104. The pivot 122 comprises a stud 130 with spaced collars 132 and 134, and is secured in the bulkhead by appropriate nut and lock washer as shown in Fig. 6 at 136. These collars are rigid on the stud and are spaced sufficiently to allow free relative rotation of the lever 120 between them. The collar 132 is notched or otherwise fashioned to receive and anchor one end of a coiled spring 138 that has its other end anchored by a pin 140 in some part of the lever 120. The spring is so stressed that it tends to rotate the lever constantly in one direction about the pivot 122, and so that the pin 126 normally tends to engage one end of the slot 128, as will presently be explained. The free end of the lever 120 extends through slots 142 and 144 in the extension 46 and the filler plate 48 where it ends with an angularly disposed ear 146 supporting a quick release fastening plug 148. The filler plate 48 is appropriately recessed at 150 at one end of the slot 144 to receive the ear 146 so that the whole lever 120 may be moved to an enclosed or flush position within the contour of the spinner rim when the lock is secured. The ear is countersunk or dished to wholly contain the head of the plug 148, and the extension 46 is appropriately apertured at 152 for passage of the plug to enter the locking receptacle 154 mounted on the strip 64. The locking receptacle shown is illustrative of only one of many that may be obtained on the open market for the purpose. It includes camming surfaces and retaining notches for cooperation with a cross pin in the plug 148, so that when the plug is inserted through the receptacle it may be rotated a short distance to seat the cross pin in the retaining notches where it is secure except for deliberate action on the part of an individual.

Figure 3:
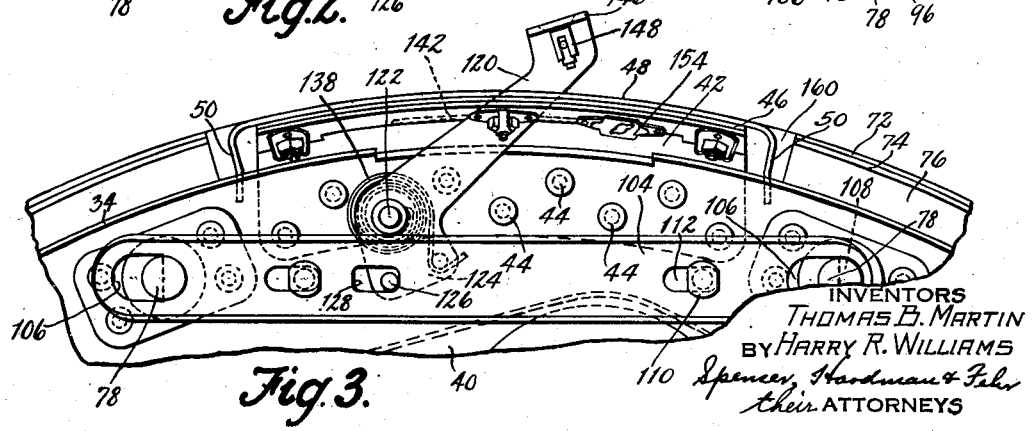
Fig. 3 is a similar view with the lock means released but not withdrawn, giving a visual indication that the lock means is not secured.

The parts are so constituted and organized that rotation of the lever 120 to the depressed position shown in Figs. 1, 2, 5 and 8, will securely lock the spinner supporting means against accidental loosening. The lever 120 is then wholly depressed and offers no obstruction upon the outside contour of the spinner. The plug 148 seating in the depressions of the receptacle 154 cannot loosen. Therefore, the pin 126 of the lever arm 124 is firm against the left hand end of the slot 128 retaining the lock bar 104 projected to the left to hold the webs 108 within the cross slots 92 of the studs 78. The webs being in place within the notches 92 there is exerted a compressive force upon the rubber-like rings 98 that retain the spinner mounting firmly secure and proof against vibration. Yet the lock and retaining means are susceptible of positive actuation for quickly removing the spinner from its support. A short turn of the plug 148 frees the cross pin from the retaining notches of the receptacle 154, and the spring 138 then acts to snap the free end of the lever 120 out of the recess in the filler plate to the position shown in Fig. 3. The lock bar 104 is still in place and the spinner is still firmly held in place but it is not secured against unintentional release. However, the lever is in such position to give a warning upon distant inspection that the spinner is not locked in place. It will be noticed that the pin 126 is now against the right hand end of the slot 128. The lever is in a convenient position to be grasped by the hand and rotated counterclockwise to the position illustrated in Fig. 4, for completely releasing the spinner fastening means. That rotation of the lever projects the lock bar 104 to the right by reason of the pin 126 engaging the right hand end of the slot 128, and slides the bar beneath the heads of the pins 110 to withdraw the webs 108 from the cross slots 92. The spinner may then be removed by moving it axially from the end of the tube 28 shown in Fig. 1, and this pulls the flange 76 away from the bulkhead 40 with a consequential withdrawal of the studs 78 from their receptacles formed by the rings 94, 98 and 100. That is made possible because the base end 72 of the spinner is notched appropriately at 160 to straddle each of the blades 18 and to lay close to or overlap the edges of the filler plates 48 mounted on the bulkhead extensions 46.

In attaching the spinner to its support, it is passed over the propeller with the notches 160 receiving the blades until the studs 78 enter the respective receptacles, and until the apex 30 pilots over the tube 28. If nothing further is done, the free end of the lever 120 will still be in the projected position shown in Fig. 4 giving a visual indication that the coupling is not secure. Pressing down the lever 120 or rotating it in a clockwise direction, first moves the pin 126 against the left hand end of the slot 128, which if then released will spring back to the position of Fig. 4. Further rotation of the lever projects the bar 104 to the left causing the webs 108 to engage the chamfer 102 and finally seat in the cross slots 92 as shown in Fig. 7. The base end of the spinner will thereby be drawn tightly against the flat portion 40 of the bulkhead which tends to compress the rings 98, holding the parts against vibration and rattle. Release of the lever at that time will allow it to snap back to the position shown in Fig. 3, giving a visual indication that the fixing of the spinner is not secure. In other words, whenever any portion of the lever 120 can be seen outside of the contour of the spinner surface, it is a warning that the spinner retention is not in its most secure condition. Pressing the end of the lever into the recess 150 and giving the plug 148 a short turn secures the lever in the spinner locking position.

While the embodiment of the present invention as herein disclosed, constitutes a preferred form, it is to be understood that other forms might be adopted, all coming within the scope of the claims which follow.

What is claimed is as follows:

1. In an aircraft propeller, the combination comprising a hub, blades rotatable in the hub, a spinner shell covering said hub and the root portion of said blades, a supporting member rigidly fastened to said hub and providing a peripheral support for said spinner shell, positioning means including pins and openings aligning the spinner shell with the supporting member, said spinner shell having one end notched to straddle said blades, filler plates secured to the supporting member at the rear of each blade and adapted to close off the notch of the spinner shell around the blade, a lock-bar slidably mounted on the supporting member and cooperating with the positioning means for retaining the spinner shell in supported relation, means for actuating the lock-bar comprising a pivoted lever extending radially outward beyond the filler plate, said filler plate having a slot permitting pivotal movement and depression of the actuating means within the contour of the filler plate when the lock-bar is in the spinner retaining position, and quick release fastening means for securing the actuating means in the depressed position for holding the lock-bar secure against release of the spinner retaining means.

2. In a spinner for the hub and blade shanks of an aircraft propeller, a bulkhead member secured to the rear of the hub, an axial extension in front of the hub, a spinner shell member piloted over the extension and over the bulkhead member for enclosing the hub, notched pins carried by one of said members adapted to extend through openings in the other of said members, lock means including a bar slidably mounted on said other member for engagement with the notches of said pins to lock the spinner shell member in the piloted relation on the bulkhead member, and a lever pivoted on one of said members and having a part oscillatable to positions within and without the contour of the spinner shell member, said lever being connected to said bar for sliding it and indicating at all times the condition of the spinner locking means as a warning against operating the propeller with an insecure spinner.

3. The structure set forth in claim 2 and resilient means connected to the lever and to the member on which it is pivoted for biasing it to a position where its mentioned oscillatable part is without the contour of the spinner.

4. In a spinner for the hub and blade shanks of an aircraft propeller, a bulkhead secured to the rear of the hub, an axial extension in front of the hub, a spinner shell piloted over the extension and over the bulkhead for enclosing the hub, a notched pin carried by the spinner shell adapted to extend through an opening in the bulkhead, manually actuatable lock means including a bar slidably mounted on the bulkhead for engagement with the notch of said pin to lock the spinner shell in the piloted relation on the bulkhead, a lever pivoted on the bulkhead and having a part oscillatable to positions within and without the contour of the spinner shell, said lever having a lost motion connection with said bar for sliding it and said part of said lever indicating at all times the condition of the spinner locking means as a warning against operating the propeller with an insecure spinner.

5. The structure set forth in claim 4, resilient means connected to the lever and to the bulkhead for biasing it to a position where its mentioned oscillatable part is without the contour of the spinner shell, and means for securing the lever within the contour of the spinner shell and the lock means in locking position.

6. The structure set forth in claim 4, in which the lock means includes webs on the slidably mounted bar for locking engagement with the notch of the notched pin carried by the spinner shell and in which the lever has a lost motion connection with the slidably mounted bar, spring means connected to the lever and to the bulkhead for biasing the lever to a position where its mentioned oscillatable part is without the contour of the spinner shell and means for securing the lever within the contour of the spinner shell and said webs in locking engagement with said notch.

7. A spinner structure for an aircraft propeller hub comprising a spinner shell member for streamlining the hub, a supporting member for supporting said spinner shell member on the hub, a notched pin carried by the spinner shell member, lock means including a bar slidably mounted on the supporting member and engageable with the notch of said pin for locking the spinner shell member to the supporting member, pivoted means on one of said members for engaging the lock means for actuating the same, and means carried by the pivoted means and releasably engageable with the supporting member for securing the actuating means against accidental movement when the spinner shell member is locked to the supporting member, said pivoted means including a part extendible through the spinner shell member for visually indicating the unlocked condition of the spinner locking member and for warning against operating the propeller with an unsecured spinner.

8. A spinner structure for an aircraft propeller hub comprising a spinner shell for streamlining the hub, support means for supporting said spinner shell on the hub, notched pins carried by the spinner shell, the support means having openings for receiving the pins to locate the spinner shell on the support means, lock means for locking the spinner shell on the support means, said lock means including a bar slidably mounted on said support means and engageable with the notches of said pins, means for actuating the lock means including a lever pivoted on the support means and having a connection with said bar for sliding it into and out of engagement with said notches, means carried by the lever and releasably engageable with the support means for securing the lever against accidental release, a part of said lever being movable to a position outward of the spinner shell, and a spring connected to the lever and to the support means for biasing said part of the lever outwardly of the spinner shell.

9. The structure set forth in claim 8, in which the connection of the lever with the slidably mounted bar is a pin and slot connection providing a range of lost motion between the lever and the bar that enables the spring to move the mentioned part of the lever outwardly of the spinner shell when the lever is not secured to the support means against accidental release and while said bar is engaged with the notches of the notched pins.

10. A spinner structure for an aircraft propeller hub comprising a spinner shell for streamlining the hub, support means for supporting the spinner shell on the hub, piloting studs carried by the spinner shell and having transverse notches, the support means having openings for receiving the studs to locate the spinner shell on the support means, lock means for locking the spinner shell on the support means, said lock means including said studs and a bar that is slidably mounted on the support means and that has slots disposed over said openings of the support means for receiving the studs, compressible ring assemblies carried over said openings and between the support means and said bar, and means for actuating the lock means movably mounted on the support means for engaging the bar to slide it relative to said openings and thereby to move it into and out of engagement with the notches on the studs when the spinner shell is located on the support means, the engageable parts of the bar and notches being formed to compress the ring assemblies about the studs when said parts are brought into engagement by the actuating means.

11. The structure set forth in claim 10, in which the actuating means includes an element biased toward a position outward of the spinner shell when the spinner shell is not secured to the support means, said element having means releasably engageable with the support means for securing the actuating means against accidental movement and for confining said element within the contour of the spinner shell.

12. An aircraft propeller comprising a hub, blades mounted on the hub, a spinner shell member for covering said hub and the root portion of said blades, a supporting member rigidly fastened to said hub and providing a peripheral support for said spinner shell member, positioning means including an opening in the supporting member and a notched pin on the spinner for aligning the spinner shell member with the supporting member, a lock bar slidably mounted on the supporting member for movement to a spinner locking position where it locks with the notch of said pin and to a spinner release position where the spinner shell member is unlocked from the supporting member, means pivoted to one of said members and connected to the lock bar for sliding it into and out of locking relation with the notched pin, the pivoted means being movable to a position where a part thereof extends outwardly of the spinner shell member, means connecting the pivoted means and supporting member for biasing said part to the position where it extends outwardly of the spinner shell member when the lock bar is in the spinner release position, and means for securing the pivoted means against movement when the lock bar is in the spinner locking position.

13. The structure set forth in claim 12, in which the pivoted means is mounted on the supporting member, the biasing means connecting the pivoted means and the supporting member is a spring, and the pivoted means is entirely within the contour of the spinner shell member when the pivoted means is secured against movement and the lock bar is in spinner locking position.

14. An aircraft propeller comprising a hub, blades mounted on a hub, a spinner shell for covering said hub and the root portion of said blades, support means fastened to said hub and providing a peripheral support for said spinner shell, positioning means including openings in the support means and notched pins on the spinner for aligning the spinner shell with the support means, a lock bar having slots in alignment with said openings for receiving said pins and slidably mounted on the support means for movement to a spinner locking position where it locks with the notches of said pins and to a spinner release position where the spinner shell is unlocked from the support, compressible assemblies between said bar and said support means, means pivoted to said support means and engaging the lock bar for sliding it into and out of locking relation with the notched pins, said assemblies being compressed when the lock bar is locked with the notched pins to provide yieldable clamping of the spinner shell to the support means, the pivoted means having a part movable to a position outward of the spinner shell, a spring connecting the pivoted means and support means for biasing said part to the position outwardly of the spinner shell, and means for securing the pivoted means against movement when the lock bar is in the spinner locking position, said part of the pivoted means extending outwardly of the spinner shell when the pivoted means is not secured against movement.

THOMAS B. MARTIN.
HARRY R. WILLIAMS.

REFERENCES CITED

The following references are of record in the file of this patent:

UNITED STATES PATENTS

| Number | Name | Date |
|---|---|---|
| 2,092,901 | Zeidler | Sept. 14, 1937 |
| 2,102,373 | Moittie | Dec. 14, 1937 |
| 2,211,217 | Peterson | Aug. 13, 1940 |
| 2,279,425 | Voysey | Apr. 14, 1942 |
| 2,365,673 | Marshall | May 8, 1945 |

FOREIGN PATENTS

| Number | Country | Date |
|---|---|---|
| 498,157 | Great Britain | Aug. 8, 1938 |
| 551,313 | Great Britain | Feb. 17, 1943 |
| 573,388 | Germany | Apr. 1, 1933 |